Patented July 16, 1935

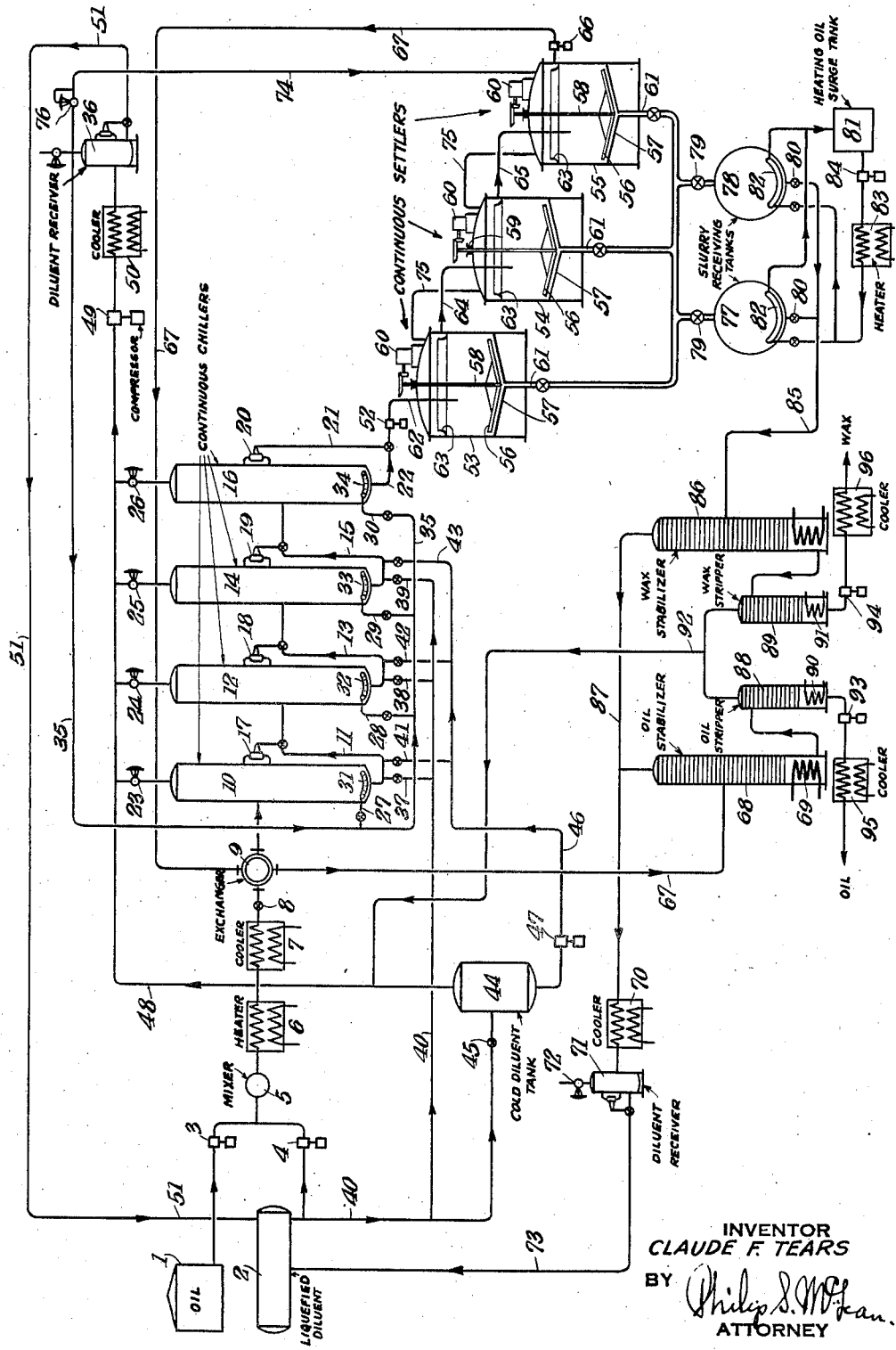

2,008,570

UNITED STATES PATENT OFFICE 2,008,570

DEWAXING LUBRICATING OIL DISTILLATES AND RESIDUES

Claude F. Tears, Mountain Lakes, N. J., assignor to The Petroleum Processes Corporation, Wichita, Kans., a corporation of Kansas Application May 25, 1934, Serial No. 727,496

4 Claims. (Cl. 196—19)

This invention relates to the dewaxing of petroleum lubricating oils, particularly those classed as cylinder stocks, the heavy distillates or residues in which the wax content consists of a preponderance of what is generally referred to as amorphous wax.

The invention involves chilling and cold settling operations on solutions of heavy lubricating oils in propane or other normally gaseous liquid hydrocarbons and is thus related in a general way to the process disclosed in the copending Tears application Ser. No. 698,283, covering production of high melting point wax and bright stock from petrolatum.

One of the special objects of the present invention is to accomplish a continuous chilling and cold settling operation as distinguished from a batch operation, such as disclosed in the case referred to.

The most desirable method of separating wax from oil solutions and propane or other liquefied gaseous hydrocarbons is by means of continuous mechanical filters or by use of pressure plate filter presses. The production of filterable wax crystals, i. e. crystals that can be filtered by mechanical filters, without use of filter aids, from propane and like solutions of oils in which the wax content is largely of the amorphous type is however impossible from the practical standpoint. By extreme decolorization and the removal of crystal forming inhibitors removed by decolorization, filterable wax may be formed but within practical commercial limits of decolorization, it is not possible to form such filterable crystals in solutions of cylinder stock distillates, residues such as steam refined stock or petrolatum.

It is possible to filter wax from chilled solutions of oil in propane when the wax is of a crystalline nature, such as is formed from solutions of wax distillates and long range residues or oils in which the wax content is largely of a crystalline structure. The structure of such wax permits the formation of a filter cake on the filters but in the case of amorphous wax, the cake either does not form or rapidly becomes a pasty mass through which filtering is impossible.

While primarily designed for the dewaxing of cylinder stocks or heavy oils and the manufacture of high melting point wax from petrolatum, the present invention, involving a continuous cold settling process is adapted also for separation of the crystalline type of wax found in wax distillates, long residuums and long range lubricating oil distillates.

Briefly, the invention involves dissolving wax bearing oil in a normally gaseous liquid hydrocarbon or similar solvent in proportions that establish a suitable gravity differential between the oil solution and solidified wax, chilling the mixture by evaporation of the solvent or by indirect chilling methods, precipitating the wax in a continuous cold settling operation under pressure, continuously drawing off the oil-solvent mixture, continuously removing the wax-solvent slurry from the settling zone and separately stripping the solvent from the withdrawn oil and wax.

If the chilling is accomplished by evaporating part of the solvent, the solvent evaporated may be replaced by additional solvent to a volume approximately equal to or in excess of the original volume, so as to maintain the ratio of solvent to total oil and wax content approximately uniform until the final chilling stage is reached, when this ratio may be increased by the addition of cold solvent.

In addition to making the process a continuous one, some of the other objects of the invention are to carry out the process as simply and as directly and economically as possible.

Further objects and novel features of process and apparatus will appear as the specification proceeds.

The drawing accompanying and forming part of the specification illustrates one practical embodiment of the invention, but as the same is primarily for purposes of disclosure, it will be appreciated that structure employed and steps of the method may be modified and changed all within the true intent and broad scope of the invention.

The single figure in the drawing is in the nature of a flow diagram.

In this view, the wax bearing oil from a storage tank 1, and propane or equivalent liquefied diluent from a pressure storage tank 2, are delivered by pumps 3 and 4, to a mixer 5, where the two are thoroughly combined in desired controlled proportions.

To insure complete solution of oil and wax in the solvent, the mixture is heated in the illustration by passage through heater 6, to a temperature usually in the range 125° F. to 200° F. Then to insure complete liquefication of the solvent, the mixture may be cooled in a cooler 7.

The heater and the cooler are held under pressure in excess of the vapor pressure of the solvent at the temperature of the heating operation by means of a properly adjusted back pressure valve 8.

Further cooling is then effected in the illustration by heat exchange with the final cold solution of wax free oil in a heat exchanger at 9.

The partially chilled solution is next introduced into the first of a battery of continuous chillers, the flow being into the middle portion of the first chiller 10, then from the bottom of this chiller through connection 11, to the middle portion of the second chiller 12, from the bottom of this chiller through line 13, into the third chiller 14, and from the bottom of this chiller through line 15, into the mid-portion of the last chiller 16.

The liquid level in the chillers is kept substantially uniform in the illustration by means of the automatic liquid level controllers 17, 18, 19, in the intermediate connections 11, 13, 15, and the liquid level controller 20, in the line 21, running from the last chiller to the continuous settlers, the latter having a line 22, joined with it from the bottom of the last chiller.

The pressure in the chillers is automatically controlled by pressure control valves 23, 24, 25, 26, connected with the heads of the chillers. These are set for diminishing pressures with the flow of solution. As a practical example, the pressure of the first chiller may be held at 90 lbs. per square inch, the second at 50 lbs., the third at 30 lbs. and the fourth at 0 lbs. per square inch.

With the pressure thus reduced in stages, it will be seen that as the solution of oil and wax in propane flows in series through these zones of diminishing pressure, solvent will evaporate in each stage, producing a resulting drop in temperature of the mixture in that stage.

As the temperature drops below the solidification point of the contained wax, the wax solidifies and tends to settle out of the mixture.

To avoid settling the wax in these chilling chambers, gas may be blown up through the contents by lines 27, 28, 29, 30, connected with perforated coils 31, 32, 33, 34, in the bottoms of the chillers, these lines being branched from a gas line 35, from the top of the diluent pressure receiver 36.

As the solvent evaporates to chill the mixture, more solvent is admitted to the bottoms of the chillers to maintain the original ratio of solvent to total oil and wax content through valved lines 37, 38, 39, from line 40, connected back to the propane storage tank 2.

When the temperature of the mixture in the chillers drops below the point where the wax starts to solidify, it is possible to introduce pre-chilled solvent into the bottom of the chillers through valved lines 41, 42, 43, thus hastening the chilling of the mixture. This pre-chilled solvent may be prepared by expanding liquid propane from the pressure storage tank 2, into a cold diluent storage tank 44, through an expansion valve 45, this tank being connected with lines 41, 42, 43, by line 46, having a pump 47 therein.

The propane evaporated for chilling from tank 44 and the continuous chillers is vented in the illustration to a compressor suction line 48. The vapor thus collected by compressor 49 is compressed and cooled in a cooler 50, under pressure sufficient to recondense it as liquid propane and the thus liquefied propane is collected in the pressure receiver 36 and returned by line 51, to the propane storage tank 2.

In a two stage compression system and with the chillers operated at the pressures stated in the above example, namely 90, 50, 30 and 0 lbs. per square inch, the first, second and third chillers may vent directly to the suction of the second stage compressor, with the first stage compressor operated at a discharge pressure of 25 to 30 lbs. per square inch. This accomplishes considerable economy in compressor operation, since only a fraction of the total gas need pass through the first stage compressor.

The rate of chilling the mixture seems not to be critical and within practical limits of compressor capacity, the mixture may be chilled as rapidly as desired. A total time in the chillers of as little as one hour will give satisfactory results. Longer chilling times of as much as six or seven hours have been practised with good results.

The final temperature to which the mixture is chilled is controlled by the pressure on the last chiller in the series and this final temperature is dependent upon the pour test desired on the finished dewaxed oil. A spread of 20° to 40° between the chilling temperature and the desired pour test is sufficient.

The chilled mixture of propane, oil and wax is transferred from the last chiller by pump 52, to the first of three continuous settlers 53, 54, 55.

These settlers are of the so-called continuous thickener type of construction and consist each unit of a vertical closed tank of relatively large diameter for its height with a slow moving scraper 56, operating over a conical bottom 57, having a central discharge outlet. These scrapers are shown as carried by shafting 58, operating through stuffing boxes 59, and driven by motors 60.

The settled wax, in the form of a pasty slurry, is directed by the scrapers out through the bottom conduits 61.

The charge to the settlers is from pump 52 through pipe 62, into the center and below the surface of the liquid in the first tank of the series. Definite liquid levels are maintained in the settlers by overflow weirs 63, forming troughs inside the peripheries of the tanks. These collect the settled liquid overflowing the weirs. A charge line 64, runs from the weir of the first settler down into the central portion of the second settler and similarly, a charge line 65, runs from the weir of the second settler down into the body of the third settler.

From the last settler, the clear settled liquid is delivered by pump 66, through line 67, and heat exchanger 9, to the oil stabilizer 68. In this stabilizer most of the propane is distilled off under pressure by heat supplied from steam coil 69 or the like.

The propane vaporized in the oil stabilizer goes off overhead and is condensed in condenser 70, and collected in a receiver 71. This receiver is shown provided with a pressure control valve 72, which controls the distillation and condensation pressure on the system. From this receiver, the liquid propane is returned to the propane storage tank through line 73.

The continuous settlers are held under pressure usually of from 50 to 60 lbs. per square inch, by means of gas from the pressure receiver 36, through line 74, and by pressure equalizing lines 75, between the heads of these tanks. The pressure in this instance, is governed by the automatic pressure controller 76, in the line 74, coming from the pressure receiver 36.

Pressure on the settlers materially aids the settling operation by preventing ebullition of the propane solution, which otherwise would result from accidental heat losses in the system.

The wax slurry discharged by the scrapers from the continuous settlers is conducted by the enlarged conduits 61, to either of the pressure receiving tanks 77, 78, these being valved so that they may be used alternately.

When one of the slurry tanks is full, it is shut in by closing the inlet and outlet valves 79, 80, and the contents then heated to force it out of the tank to the wax stabilizer.

In the illustration, the heating is effected by circulating hot oil or the like from a tank 81, through a heating coil 82, in the bottom of the tank, this circulating system including a suitable heater 83, and pump 84.

This heating of the wax slurry in the receiving tank melts the wax content and generates pressure by vaporization of the propane with the wax. When the pressure thus generated in the receiver exceeds the pressure in the stabilizer system, the discharge valve 80, is opened and the dissolved wax slurry is delivered through line 85, to the wax stabilizer 86. This special method of handling the wax slurry is necessitated by reason of the fact that the settled slurry carries so little propane that it is a thick pasty mass, which can not be handled by usual pumping methods.

In the wax stabilizer 86, the propane is distilled off through line 87, to the same condensing and receiving system described with the oil stabilizer and returned to storage as liquid propane.

The oil and wax from the bottoms of the respective stabilizers flow hot to the low pressure strippers 88, 89, where heat is applied by means of steam coils 90, 91, or the like. These strippers are connected at the top through line 92, to the compressor suction line 48, and thus operate at the compressor suction line pressure, acting as low pressure strippers for removal of the last traces of propane from the oil and wax.

The finished oil and wax are pumped from the bottoms of the strippers 88, 89, by pumps 93, 94, through coolers 95, 96, to suitable oil and wax storage.

If indirect chilling were used in place of direct chilling, the chillers would be provided with cooling coils for circulation of refrigerated brine or into which propane, ammonia or other refrigerating agent could be expanded. The solution ratios may be the same with indirect cooling as those in direct chilling by vaporization of the solvent.

The amount of solvent used in the original mixture of oil and solvent and the amount to be added, in the case of direct chilling during the chilling operation depends upon the amount of wax in the charging stock and the amount of this original wax to be removed in the process.

In the final settling operation, the ratio of solvent to wax in the wax slurry is reduced to within the range of 0.25:1 to 1:1. The amount of solvent removed from the wax slurry is then established by the wax to be removed. When this amount of solvent has been removed, the final ratio of solvent to oil in the oil layer should be within the limits of 4:1 and 8:1 with the most practical ratio, at present, at 5:1.

As a specific example, when running petrolatum containing 50% wax and 50% bright stock, the original mixture of propane and petrolatum is made in the proportion of 2.75:1. This ratio is maintained through the first three chillers by the addition of relatively warm or relatively cold liquid propane and in the last chiller the ratio is increased to 3.25:1 by the addition of cold liquid propane. When the settling operation is complete, the wax layer contains ½ part of wax for each part of original petrolatum charge, since the wax content is 50% and the ratio of propane to wax in the settled wax layer is 1:1. Based on the original charge, this represents a ratio of ½:½ so the propane and oil remaining in the oil layer is 2.75:½ or an actual ratio of 5.5:1.

When running a steam refined stock containing 90% oil and 10% wax, the original mixture is made in the proportion of 3:1 and during the chilling operation, this ratio is increased to 4.5:1. At the completion of the settling operation, the wax layer contains 0.1 part of oil and 0.1 part of propane, based on the original oil charge in the ratio of 1:1. This leaves the oil layer with 4.4 parts of propane and 0.9 part of oil in the ratio of 4.9:1.

The invention provides a practical efficient and economical method of continuously dewaxing lubricating oil stocks, largely automatic in action and employing apparatus much of standard and well-known design. For continuous chillers, vertical pressure tanks may be used with perforated coils in the bottoms and liquid level controlling valves connected in the sides. For the continuous settlers, large diameter pressure tanks may be employed having inclined bottoms draining to the center with large discharge outlets for the wax slurry, built-in overflow weirs and shafting operating through stuffing boxes to carry the wax stirrers over the inclined bottoms. In particular, the invention makes it possible to economically handle the so-called cylinder stocks containing mostly the amorphous wax which has been so difficult to treat heretofore.

The gradual chilling in successive stages at diminishing pressures and supplying additional solvent up through the mixture prevents precipitation in the chillers and enables continuous flow being maintained through the chillers to the settlers. If necessary, part or all of the flow may be taken off from the bottom of the last chiller through the line 22.

By settling under pressure in the successive stages, the wax is gradually taken out and continuously removed and the settled oil is gradually cleared and continuously removed from the settling units. The employment of pressure and stirring, forces the wax slurry continuously out of the settlers into the receiving tanks and when these tanks are shut in and heat supplied, the wax is melted and forced out by the pressure of the vaporized solvent to the wax stabilizer. Thus by alternate use of the receiving tanks, the system can be kept in continuous operation. Low pressure distillation is made possible by connection of the oil and wax strippers with the suction line of the compressor. By proper control of pressures, efficiency and economy of operations is effected. Heat exchange of the settled oil flowing to the oil stabilizer with the mixture going to the first chiller effects economy in heating requirements. Oxidation is avoided and the best characteristics of wax and oil are retained, resulting in production of a good high melting point wax and a bright stock of superior characteristics. With proper control, the system may be made for the most part automatic in operation. While chilling by evaporation has very definite advantages, chilling by indirect methods may be employed.

What is claimed is:

1. The herein disclosed method of continuously dewaxing petroleum lubricating oils, comprising dissolving such oils under pressure in liquefied normally gaseous hydrocarbon, chilling the solution by relieving pressure to effect evaporation of part of the solvent, passing the chilled solution into the first of a series of closed settling zones under pressure in excess of the vapor pressure of the solvent at the temperature of the chilled solution, overflowing settled liquid from the top of one pressure settling zone into the body of the next pressure settling zone in series, slowly stirring and withdrawing the settling wax slurry from the bottoms of said pressure settling zones, withdrawing the settled liquid from the top of the last pressure settling zone and stripping the same of solvent.

2. The herein disclosed method of continuously dewaxing petroleum lubricating oils, comprising dissolving such oils under pressure in liquefied normally gaseous hydrocarbon, chilling the solution by relieving pressure to effect evaporation of part of the solvent, passing the chilled solution into the first of a series of closed settling zones under pressure in excess of the vapor pressure of the solvent at the temperature of the chilled solution, overflowing settled liquid from the top of one pressure settling zone into the body of the next pressure settling zone in series, slowly stirring and withdrawing the settling wax slurry from the bottoms of said pressure settling zones, withdrawing the settled liquid from the top of the last pressure settling zone and stripping the same of solvent, collecting the wax slurry withdrawn from the pressure settling zones alternately in one of a pair of receiving zones, closing and applying heat to one receiving zone while the other receiving zone is filling to thereby melt the wax and generate pressure by vaporization of the accompanying solvent in the closed receiving zone, connecting such receiving zone with a solvent distilling zone at a time when such generated pressure has exceeded the pressure of such distilling zone and distilling to remove the solvent.

3. The herein disclosed method of continuously dewaxing petroleum lubricating oils, comprising dissolving such oils under pressure in liquefied normally gaseous hydrocarbon, chilling the solution by relieving the pressure to effect evaporation of part of the solvent and consequent chilling, passing the chilled solution into the first of a series of closed pressure settling zones under pressure in excess of the vapor pressure of the solvent at the temperature of the chilled solution, overflowing settled liquid from the top of one pressure settling zone into the body of the next pressure settling zone in series, slowly stirring and withdrawing the settling wax slurry from the bottoms of said pressure settling zones, withdrawing the settled liquid from the top of the last pressure settling zone and stripping the same of solvent, collecting the wax slurry withdrawn from the pressure settling zones alternately in one of a pair of receiving zones, closing and applying heat to one receiving zone while the other receiving zone is filling to thereby melt the wax and generate pressure by vaporization of the accompanying solvent in the receiving zone, connecting such receiving zone with a solvent distilling zone at a time when such generated pressure has exceeded the pressure of such distilling zone, collecting evaporated solvent from the chilling zone and compressing and condensing the same to liquid form, applying pressure from said compressing operation to the continuous pressure settling zones and connecting the oil and wax stripping and solvent distillation zones with the suction side of the compression stage to effect low pressure solvent distillation.

4. The herein disclosed process of continuous dewaxing of petroleum lubricating oils, comprising dissolving such oils in a solvent, chilling the resultant solution, settling the chilled mixture continuously in successive zones under pressure in excess of the vapor pressure of the solvent at the temperature of the chilled solution, while running off settled liquid from the top of one zone into the body of liquid in the succeeding zone and continuously drawing off settling wax slurry from the bottoms of such settling zones, withdrawing settled liquid from the top of the last settling zone and continuously collecting wax slurry withdrawn from the several settling zones, stripping the settled top liquid from the last settling zone of solvent and stripping the collected wax slurry of solvent by confining same and applying heat thereto to melt the wax and evaporate the accompanying solvent to generate pressure sufficient to overcome the pressure of distillation in the wax stripping zone.

CLAUDE F. TEARS.